(12) United States Patent
Linke

(10) Patent No.: US 7,814,187 B2
(45) Date of Patent: Oct. 12, 2010

(54) METHOD AND PROCESSING SYSTEM FOR DETERMINING THE SPATIAL STRUCTURE OF A CONTROL SYSTEM

(75) Inventor: Stefan Linke, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 1161 days.

(21) Appl. No.: 10/344,373

(22) PCT Filed: Aug. 6, 2001

(86) PCT No.: PCT/DE01/03005

§ 371 (c)(1),
(2), (4) Date: Feb. 11, 2003

(87) PCT Pub. No.: WO02/14963

PCT Pub. Date: Feb. 21, 2002

(65) Prior Publication Data

US 2003/0181993 A1     Sep. 25, 2003

(30) Foreign Application Priority Data

Aug. 11, 2000 (DE) .................................. 100 39 415

(51) Int. Cl.
*G06F 15/173* (2006.01)
(52) U.S. Cl. .................. 709/223; 709/224; 709/248; 709/249; 709/253
(58) Field of Classification Search ......... 709/200–201, 709/248–253, 223–225
See application file for complete search history.

(56) References Cited

U.S. PATENT DOCUMENTS

| | | | | |
|---|---|---|---|---|
| 5,034,945 A * | 7/1991 | Kimoto et al. | ............... | 370/227 |
| 5,204,669 A * | 4/1993 | Dorfe et al. | ............ | 340/825.52 |
| 5,519,878 A | 5/1996 | Dolin, Jr. | | |
| 5,522,042 A * | 5/1996 | Fee et al. | ..................... | 709/226 |
| 5,757,640 A * | 5/1998 | Monson | ........................ | 700/2 |
| 6,108,702 A * | 8/2000 | Wood | ........................ | 709/224 |
| 6,205,532 B1 * | 3/2001 | Carvey et al. | .................. | 712/1 |
| 6,233,611 B1 * | 5/2001 | Ludtke et al. | ............... | 709/223 |
| 6,480,473 B1 * | 11/2002 | Chambers et al. | ............ | 370/253 |
| 7,315,826 B1 * | 1/2008 | Guheen et al. | .................. | 705/7 |

FOREIGN PATENT DOCUMENTS

| | | |
|---|---|---|
| DE | 195 46 831 A1 | 6/1996 |
| DE | 196 24 929 A1 | 1/1998 |
| DE | 198 57 649 A1 | 6/2000 |
| EP | 0 770 944 A1 | 5/1997 |
| EP | 0 833 426 A2 | 4/1998 |
| WO | WO 00/20938 | 4/2000 |

OTHER PUBLICATIONS

Bangemann et al., "Integration of Fieldbus Systems in Computer-Aided Facility Management" Proceedings of 24th Annual Conference of the IEEE Industrial Electronics Society, vol. 3, 31, Sep. 4, 1998, pp. 1835-1840.

* cited by examiner

*Primary Examiner*—William C Vaughn, Jr.
*Assistant Examiner*—Mohamed Ibrahim
(74) *Attorney, Agent, or Firm*—Staas & Halsey LLP

(57) ABSTRACT

Spatial structure of system modules is automatically determined with respect to other system modules. Information on the spatial structure of a first system module is determined with respect to other system modules by providing an information module, which is respectively associated with the system modules, containing information on the spatial structure of each respective system module, and which can be accessed via an associated interface.

16 Claims, 3 Drawing Sheets

METHOD AND PROCESSING SYSTEM FOR DETERMINING THE SPATIAL STRUCTURE OF A CONTROL SYSTEM

CROSS REFERENCE TO RELATED APPLICATIONS

This application is based on and hereby claims priority to PCT Application No. PCT/DE01/03005 filed on 6 Aug. 2001 and German Application No. 100 39 415.9 filed on 11 Aug. 2000, the contents of which are hereby incorporated by reference.

BACKGROUND OF THE INVENTION

One aspect of the invention relates to a method and to a processing system for determining the spatial structure of a control system with respect to the positions/positioning possibilities of system modules.

A control system, for example an automation or process control system, is generally composed of a number of system modules. System modules are understood here to be all components, which are contained or may be contained in a control system. System modules include software components and in particular hardware components. Examples of system modules in the present sense are bus systems, for example a ring bus system or a field bus system, as well as control system units and terminal components. Control system units are understood here to be, for example, automation system units or system units of process control systems, which form an enclosed control unit and are used, for example, to control specific plant components. These control system units may therefore be conceived of as a subsystem of the superordinate control system. Terminal components may be computer units, measuring units, actuation and control units or the like. Software modules in the sense of system modules are, for example, communications interfaces or data processing programs.

A complex control system for an industrial plant is generally planned in a first step on a computer by suitably combining the desired components, that is to say the system modules, in order to implement the plant concept. Here, the different system modules are usually presented in an electronic catalog.

In the course of the planning, the spatial structure of the control system is gradually built up with respect to the positions of the system modules. The spatial structure is also referred to as topology. As a rule, the individual system modules already have their own predefined spatial structure (topology). If a specific bus system is selected as the system module, for example during the planning, this selection simultaneously predefines a spatial structure. For example, the selected system module defines a ring bus which provides in total a specific number of connection possibilities. The underlying topology is also fixed when a specific control system unit is selected. This is because, for example, a hardware configuration is fixed for this unit, the configuration assigning a fixed number of switchboxes (racks) on a first level and assigning a fixed number of mounting locations (slots) to each switchbox in a second level.

During the planning, the operating personnel are confronted with the problem that they must be very familiar with the individual system modules, in particular with their spatial structure. This problem is similarly also encountered with existing plants or in the case of only partially planned plants in which additions are to be made. The operating personnel must use their own knowledge of the individual system modules in order to recognize the topology of the control system and determine, for example, where there are still free locations for hardware components.

SUMMARY OF THE INVENTION

One aspect of the invention is based on the object of permitting the spatial structure of a control system to be determined automatically with respect to the position/positioning possibilities of system modules.

The object may be achieved by a method for determining the spatial structure (topology) of a control system with respect to the positions/positioning possibilities of system modules, in which information on the spatial structure of a selected system module is determined with respect to the position/positioning possibility of further system modules, in that an information module which is respectively assigned to the system modules and which has information on the spatial structure of the respective system module is provided, and in that the information on the spatial structure of the selected system module is interrogated via an interface which is assigned to its information module, and is subsequently further processed.

The decisive advantage of this method is the fact that the topology information can be stored and called. The information can be determined automatically by a simple interrogation routine. In this way, the operating personnel do not require any extensive knowledge of the spatial structure of a system module, that is to say of the arrangement or arrangement possibilities of further system modules or components. The selected system module will have been selected, for example, by the operating personnel during the initial planning as the main or basic system module. However, even in the case of an existing control system, the selected system module may also be a system module which is already integrated in the plant.

In order to permit simple planning, the determined spatial structure of the system module is represented graphically. In the simplest case, this is carried out in that the topology is represented on a display device, for example a screen.

During the determination of the positions/positioning possibilities of the selected system module, it is preferably detected whether one of the positioning possibilities is occupied by a further system module. This is of decisive advantage in the case of already existing plants or in the case of partially planned plants, in order to be able to provide an overview of the already existing topology. The operating personnel are therefore informed of whether individual positions of the selected system module are already occupied. The personnel therefore recognize immediately at which positions there are still expansion possibilities.

In an advantageous embodiment, the information indicating that a specific position is occupied by a further system module is stored in the information module of the selected system module. This ensures that changes are registered in the course of planning and stored at a single location which contains the topology information with respect to the respective system module. This has the advantage that when the topology information of the selected system module is called, the information as to which position is already occupied appears immediately.

In an expedient embodiment, information indicating which position is occupied by which further system module is simultaneously stored. The operating personnel are thus provided not only with the information indicating that a position is occupied but also with the information indicating which further system module is occupying this position. In this way, the further system modules which are arranged at the selected system module therefore also become transparent, and the topology of the control system is easy to understand for the operating personnel.

The further system module is preferably represented graphically at the respective position here. The graphic representation is in particular selected here in such a way that by reference to the symbols the operating personnel recognize immediately which of the system modules it is.

In one particularly expedient embodiment, each system module is assigned an identifier. The identifier comprises in particular a type identifier and an entity identifier. The type identifier indicates in this case the type of the system module, and the entity identifier stands for a specific system module of this type. The type identifier is abstract in the sense that it is independent of the specific embodiment of the respective system module. The entity identifier is abstract in the sense that it is independent of the planning software (application program) and may contain system-specific data. The identifier is therefore embodied as a type of key which permits only one abstract assignment.

As a result, the system for automatically determining the topology is of comparatively simple design. If, specifically, a further system module is already placed at the selected system module, the information indicating which of the system modules it is merely stored in the form of the identifier in the information module which is assigned to the selected system module. The identifier ensures an unambiguous assignment of the system module. Via the interface of the information module of the selected system module, the topology information of the selected system module is therefore transferred, plus the identifier of further system modules which are already present at specific positions of the selected system module.

The advantage is the fact that neither an application for automatically determining the topology, that is to say for example a planning software package, nor the information module of the selected system module, has to know the actual topology of the further system module. The communication between the planning software (application program) and the individual information modules therefore takes place via the respective interfaces of the information modules in an encrypted form, and is independent of component-specific and manufacturer-specific peripheral conditions relating to the respective system modules. This makes the system easy to expand. A new system module can easily be integrated. For this purpose, all that is necessary is to implement a correspondingly configured information module and to assign a specific identifier.

The assignment of an information module to the respective system module is therefore preferably carried out by the identifier. In particular, the assignment is carried out exclusively by the identifier.

In one expedient configuration, when a system module is used repeatedly its information module is assigned a plurality of identifiers, and a different data record is created for each identifier in the information module. All that is necessary is therefore in each case one information module per system module, even if the system module is allocated repeatedly. This has the advantage that the general information on the system module which is stored in the information module only needs to be stored once.

Preferably, for a simple assignment, each identifier is assigned a specific information module (via the type identifier) in a memory table. This permits simple orientation or "navigation" of the planning software.

During the determination of the topology of the selected system module, it is preferably determined immediately whether a further system module has a spatial structure, and which spatial structure, with respect to the position/positioning possibility of additional system modules. The structure of the further system module is preferably determined here and represented—in the same way as that of the selected system module. The topology of the selected system module forms a first topology level and the topology of the further system module forms a further topology level. This makes it easily possible to represent topologies with very different degrees of complexity with a multiplicity of topology levels for a control system with comparatively little expenditure. A significant element here is the identifier which makes it possible to navigate without difficulty in the planning software, even through complex structures. The suitable embodiment of the interfaces which are assigned to the respective information modules and which are embodied, for example, as what is referred to as a "COM Interface" is essential for this. This COM interface is embodied in particular as key/identifier for the respective information module.

The navigation through the spatial structure of the control system is carried out here in such a way that, starting from the selected system module, the planning software navigates to the corresponding information module by reference to the identifier assigned to the system module, and the topology information is obtained from the information module via the interface. If a number of positions are occupied by further system modules, the identifiers of the system modules are transferred from the information module of the selected system module to the planning software. In the next step, the planning software actuates the information module which is assigned to the respective identifier and calls the topology information which is associated with this identifier. Each information module of a system module therefore includes cross-references to the following topology level, which has further system modules.

The object is also achieved by a processing system for determining the spatial structure of a control system with respect to the position/positioning possibility of system modules, in which information is stored on the system modules which each have a defined spatial structure with respect to the possible positioning of further system modules, each system module is assigned an information module which has information on the spatial structure of the respective system module, each information module is assigned an interface via which the information on the spatial structure can be transferred, a planning software package is provided by which the spatial structure of a selected system module can be interrogated via the interface, and in which the determined spatial structure can be fed to an output unit.

The advantages and preferred refinements which are disclosed with respect to the method are to be appropriately transferred to the processing system.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
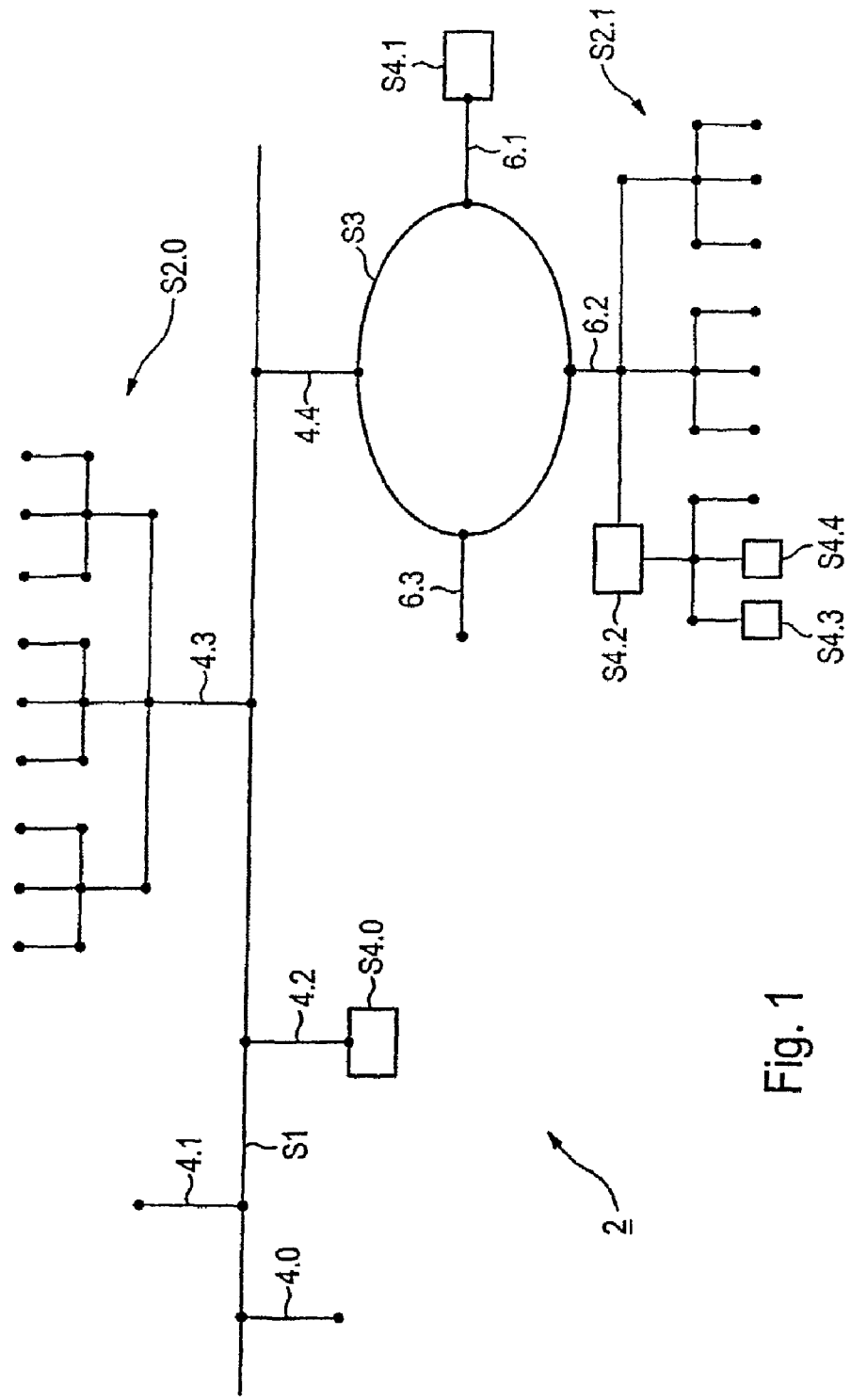
FIG. 1 shows a schematic view of the spatial structure of a control system.

Reference will now be made in detail to the preferred embodiments of the present invention, examples of which are illustrated in the accompanying drawings, wherein like reference numerals refer to like elements throughout.

The spatial structure or else topology of a control system 2 according to FIG. 1 comprises a multiplicity of different system modules S1-S4. The control FIG. 2 has, as selected system module, also referred to as main system module, a bus system S1, for example a field bus, having five connection positions 4.0-4.4. The bus system S1 comprises only one level here. While the positions 4.0 and 4.1 are unoccupied, in each case different system modules S2.0, S3, S4.0 are provided at the positions 4.2 to 4.4.

The first numeral of the designation of the system modules indicates here a type identifier, and the second numeral an entity identifier. A terminal component S4.0 without a further independent spatial structure is connected here as system module to the connection position 4.2. This terminal component S4.0 is, for example, a display device or input device.

A control system unit S2.0 which has an independent spatial structure, specifically a tree structure with a plurality of connection possibilities on two levels, is connected as system module to the connection position 4.3. Such a control system unit S2 makes available, for example on the first level, a number of switchboxes or racks which in turn have a number of plug-in locations, in particular for terminal components S4, on the second level.

A ring bus S3 with three connection positions 6.1 to 6.3 is connected as system module to the connection position 4.4. Here, a terminal component S4.1 is connected to the connection position 6.1 on the next level. A further control system unit S2.1, which has the same basic topology as the control system unit S2.0, is provided at the connection position 6.2. They differ only with respect to the specific occupation of their connection positions. Some of the connection positions of the further control system unit S2.1 are occupied by terminal components S4.2-S4.4. For the sake of simplicity, a distinction is not made here between the terminal components S4. However, as a rule terminal components S4 with different functions which define respectively independent system modules will be arranged at the different positions. In particular, such a system module can also be represented by a software module which controls, for example, communications sequences between hardware terminal components.

The control system 2 according to FIG. 1 accordingly has a total of three topology levels. The first level is formed here by the bus system S1. The second topology level is formed by the system modules which are connected to the main system module (bus system S1), and the third topology level is formed by the system modules which are connected to the system modules of the second topology level. Here, one system module can itself have a plurality of levels within one topology level—as do, for example, the control system units S2.0 and S2.1.

Such a control system 2 connects, for example, the individual components of a complex system to one another. Here, plant components, which are a large distance apart, are connected to one another via the bus system S1 (field bus), and for example an enclosed subunit of the entire system is controlled using the control system unit S2.0. The same applies to the ring bus S3 with the terminal components S4, and the control system unit S2.1 which is used, for example, to control a further subsystem of the entire system.

Figure 2:
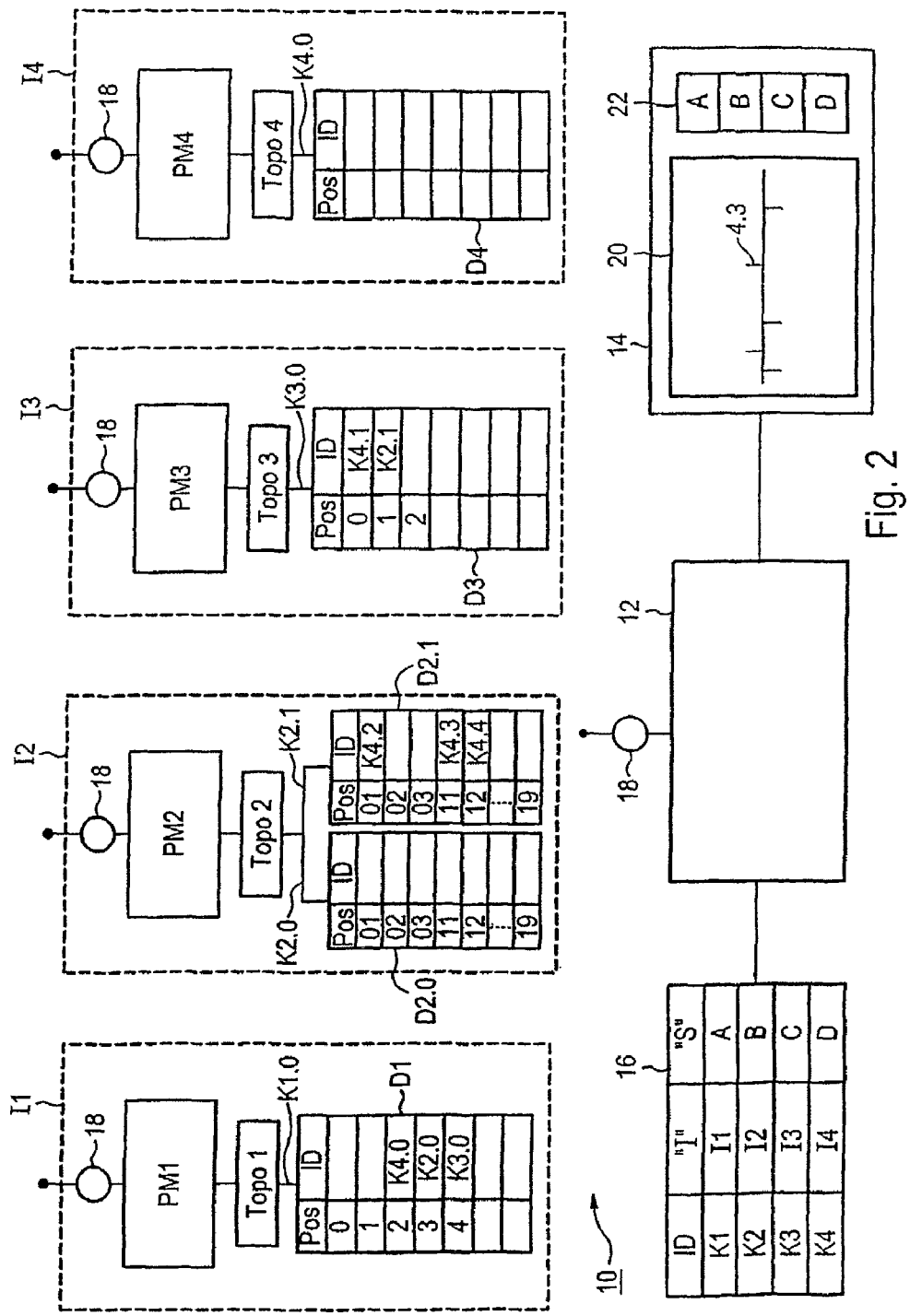
FIG. 2 shows a schematic view of a processing system for carrying out the method for determining the spatial structure of the control system.

The method for automatically determining the spatial structure (topology) of the control system 2 with respect to the positions/positioning possibilities of system modules S1 to S4 which can be combined with one another is explained below with reference to a processing system 10 according to FIG. 2. The processing system 10 comprises four information modules I1 to I4 which are each assigned to the system modules S1 to S4 according to FIG. 1. The processing system 10 also comprises a user or planning software package 12, an output unit 14 in the form of a screen with a display 20 and a selection field 22, as well as a memory table 16 which the planning software package 12 accesses. The processing system 10 is installed; for example, on a local computer unit and all the information which is necessary for the processing system can therefore be accessed centrally.

The individual information modules I1 to I4 each have an interface 18, a program module PM1 to PM4 and an information unit Topo 1 to Topo 4. The program modules PM1 to PM4 contain general program components for the respective system module, which characterize the module and permit, for example, its implementation in the control system 2. Information on the spatial basic structure of the respectively assigned system module S1 to S4 is stored in the information units Topo 1 to Topo 4. In the case of the system module S1, that is to say of the field bus, this topology information on the basic structure would include in the fact that the system module S1 is a field bus system with a total of four connection positions. This topology information according to the information unit Topo 1 is represented by way of example in the display 20 of the output unit 14. In addition to the information unit Topo 1 to Topo 4, the information modules I1 to I4 each have data records D1 to D4 in which information on the specific refinement of the topology of the respective system module S1-S4 is stored. The data records D1 to D4 accordingly contain information indicating which positions are occupied by which further system modules.

For this purpose, the data records D1 to D4 are schematically represented as a table whose first column indicates the position of the system module S1 to S4, and the second column indicates the identifier number (ID) of the system module S1 to S4 which occupies this position. The design of the control system 2 according to FIG. 1 is represented in the data records D1 to D4 according to FIG. 2. The data record D1 indicates here that the positions 0 and 1 of the system module 1 are not occupied, while the position 2 is occupied with a system module to which the identifier number or identifier K4.0 is assigned. The same applies to the positions 3 and 4 to which in each case a system module with the identifier K2.0 and K3.0 is assigned.

The information module I2 has a total of two data records D2 and D2.1, since—as is apparent from FIG. 1—the basic structure of the system module S2 is used twice in the control system 2, the two control modules S2.0 and S2.1 having different structures with respect to their specific configuration. For this reason, in order to identify them unambiguously it is necessary for each specific system module S2.0 and S2.1 to be assigned a separate identifier and for the information module I2 of the respective identifier to make available specific assigned topology information. The data records D2.0 and D2.1 are each assigned to the identifier K2.0 and K2.1 (K2=type identifier, 0.0, 0.1=entity identifier). Here, the system module S2.0 with the identifier K2.0 is arranged at the position 3 of the system module S1, as is apparent from the data record D1 of the information module I1.

The position information in the data memories D2.0 and D2.1 is composed of two numerals, the first numeral indicating the first level of the system module S2, and the second numeral indicating its second level. Accordingly, on the first level a total of three positions are possible (01-03), and in the second level a total of nine positions (11-19) are possible. As no further system modules are connected to the system module S2.0, the second column in the data record D2.0 is free. In contrast, according to data record D2.1 the position 1 of the system module S2.1 (cf. FIG. 1) is occupied by a system module with the identifier K4 (therefore a terminal component), as are the positions 11 and 12. According to the same system, the data memory D3 is also occupied. The data memory D4 is in principle empty as the terminal components representing the system modules S4 do not have their own position possibilities for the connection further system modules.

In the memory table 16, the assignment of the identifier number or identifier to the respective information module I1 to I4 as well as, for example, to a describing designation of the respective system module S1 to S4 is stored. The describing designation is indicated by the letters A to D, which each represent a specific system module.

In order to plan a complex control system 2, the user (operating personnel) adopts the following procedure: the planning software 12 presents the user with a selection field 22 on the output unit 14, in which selection field 22 the different system modules S1-S4 which are in principle available are specifically designated by A-D. The user selects a specific symbol module in a known fashion by clicking on and dragging the symbol representing the system module onto the display 20. The planning software 12 then uses the memory table 16 to assign which information module is assigned to the name of the system module and navigates to the respective information module via its interface 18. In the present case, for example, the particular system module A was selected (represents system module S1) to which the information module I1 is assigned. From I1, the planning software 12 receives the topology information from the information unit Topo 1. At the start of the planning, the data record D1 is empty so that only the basic topolgy is transferred by the information module I1. This basic topology is displayed on the display 20, for example in the form represented. Starting from the selection of the particular system module by the user, the method for determining the spatial structure assigned to this system module proceeds completely automatically and the user immediately receives information as to the positions at which he can place further system modules.

In the next step, he occupies, for example, the position 4.3 of the represented field bus, selected by him, with the system module B which is known to him by name (represents system module S2). Now, in the same way as before the planning software 12 determines automatically the topology of the system module B and uses it to navigate to the information module I2 by the memory table 16. From the information module I2 it receives the basic topology information from the information unit Topo 2 via the interface 18, and represents the basic topology information graphically at the position 4.3. There is also the possibility for the system module A to be represented initially by a symbol at this position and for the entire structure to be represented only in response to an input signal of the user. At the same time as the occupation of the position 4.3 with the system module B, the planning software 12 causes the identifier K2.0 for the system module S2.0 to be stored in the data record D1 at the position 3. These steps are repeated successively until the user has terminated or interrupted the planning. After the planning, all the relevant information relating to the topology of the entire control system 2 is stored in the processing system 10.

If it is then necessary to expand or change this control system 2, the existing spatial structure of the control system is determined by the planning software 12 in the same way. In order to start this method, all that is necessary is an instruction that the selected system module or main system module is represented by S1. By reference to this information, the planning software 12 navigates to the information module I1, therefore calls the topology information from it and represents the topology information graphically on the display 20. At the same time, the planning software 12 receives the information indicating that a number of positions are occupied, and receives the identifiers K2.0 to K4.0 of the further system modules S2-S4 at these positions. With reference to the identifiers, the planning software 12 assigns, by the memory table 16, the information module I2-I4 which is responsible and calls the further topology information relating to the second topology level from them. For each further system module S2-S4 the system automatically recognizes here whether further system modules S2-S4 are arranged at this system module S2-S4, and where these system modules S2-S4 are arranged. Thus, the complete topology of the control system is built up in a simple and completely automatic way and can be represented on the display 20.

An essential element here is that the planning software 12 itself does not have to have any detailed knowledge of the respective system modules S1-S4 as the navigation takes place independently of the specific features of the respective system modules S1-S4. Instead, an abstract, manufacturer-neutral identifier K1-K4 is provided which permits simple and rapid assignment and navigation in order to be able to call the necessary information quickly. In particular, this system presents, in a simple way, the possibility of integrating a new system module. To do this, all that is necessary is to provide a further information module which characterizes to the new system module and to correspondingly expand the memory table 16.

According to one preferred refinement, the interfaces 18 which are assigned to the respective information modules I1 to I4 also perform functions relating to the identifier. Such an interface is embodied, for example, as what is referred to as a COM interface. The respective information modules I1-I4 preferably generate themselves the entity identifier and type identifier assigned to them and present them at the interface (COM interface) as abstract information. The identifier can thus be accessed by the other information modules and the planning software.

Figure 3:
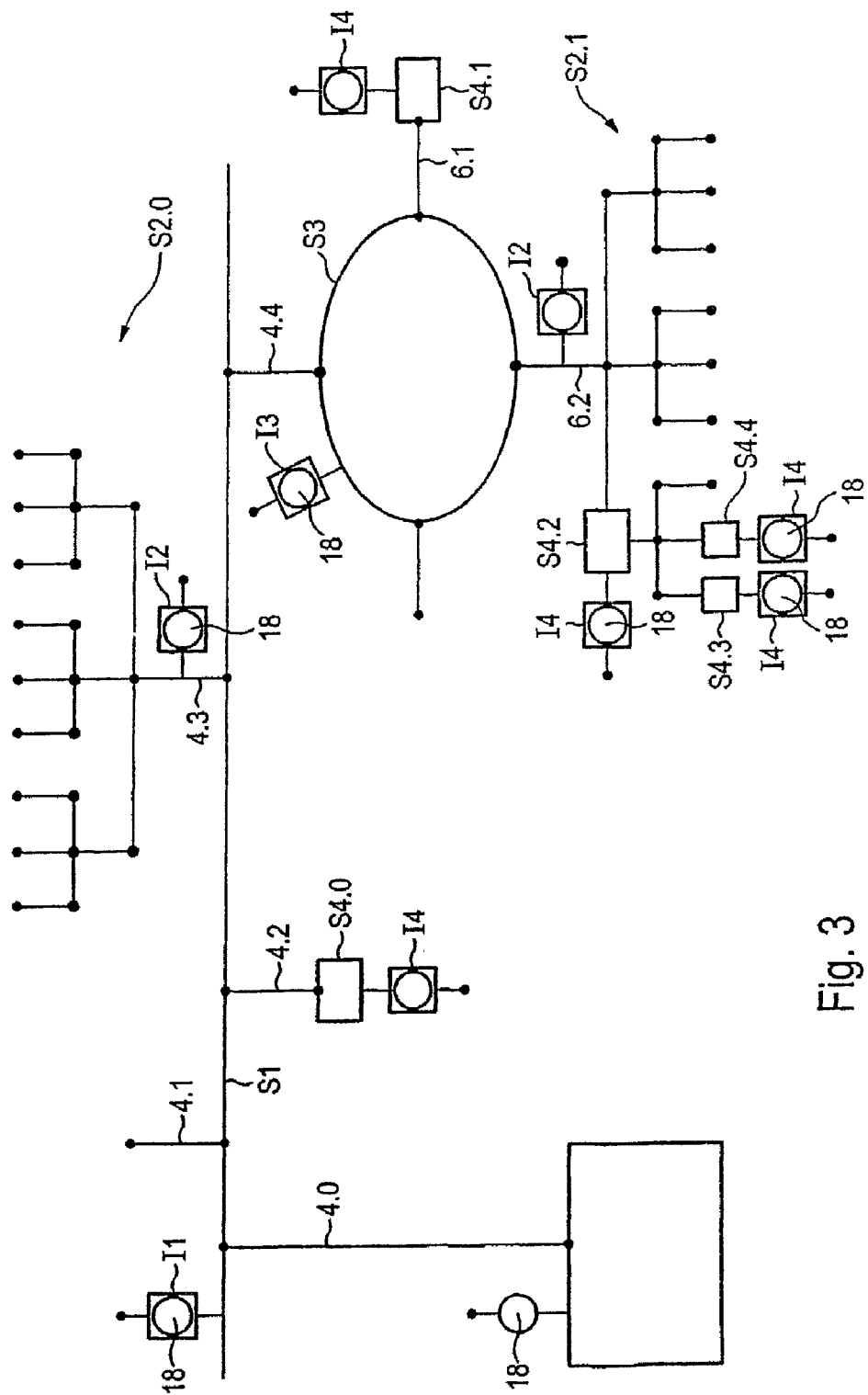
FIG. 3 shows the representation of the spatial structure according to FIG. 1, each system module being assigned an interface for transferring information to a planning software package.

Hitherto, it was assumed that the information is stored centrally at one location. As an alternative to this, there is provision according to FIG. 3 for the specific information relating to the individual system modules S1-S4 to be stored directly in situ, that is to say in a decentralized fashion at the location of the respective system modules S1-S4. With such an system, it is, of course, also possible for thereto be mixing between the central storage and decentralized storage. In FIG. 3 in which a control system 2 with the same structure as in FIG. 1 is illustrated, the decentralized storage is indicated by the fact that the respective information modules I1 to I4 with the interfaces 18 are assigned at the system components S1 to S4. In order to determine the existing spatial structure of the control system 2, for example the planning software 12 is connected to the bus system 51 and firstly calls the information from the information module I1 via the spatial structure of the bus system S1. The spatial structure is built up in the same way as described in FIG. 2, with the difference that the individual information modules I1-I4 are not stored centrally but rather have to be called directly in situ in a decentralized fashion. The communication is carried out here via the bus system.

The invention has been described in detail with particular reference to preferred embodiments thereof and examples, but it will be understood that variations and modifications can be effected within the spirit and scope of the invention.

The invention claimed is:

1. A method for determining a topology of system modules, comprising:
    obtaining information on the topology of a first system module with respect to at least one second system module, the first and the second system modules selected from the group consisting of control system units and terminal components;
    automatically recognizing the existence of at least one further system module;
    determining a spatial structure of at the least one further system module with respect to the topology of the first system module with respect to the at least one second system module;
    providing a separate information module for each of the first and the at least one second system modules;
    storing connection information of the first system module in the information module of the first system module, the information module having information on the topology of the first system module with respect to the at least one second system module, and the spatial structure with respect to the possibilities for positioning of the at least one further system module, the information module of the first system module having no information about the topology of the further system module,
    retrieving the connection information on the topology of the first system module via an interface assigned to the respective information module of the first system module;
    processing the connection information;
    outputting the connection information on the topology; and
    using the connection information to add the at least one further system module.

2. The method as claimed in claim 1, wherein topology in the respective information module is represented graphically.

3. The method as claimed in claim 1, wherein while obtaining information on the topology of the first system module, it is detected whether at least one position is occupied by another system module.

4. The method as claimed in claim 1, wherein information indicating if a position is occupied by the other system module is stored in the information module.

5. The method as claimed in claim 4, wherein information indicating which positions are occupied by which system modules is stored.

6. The method as claimed in claim 5, wherein the other system module and the first system module are graphically represented in a graphic representation of the topology, at their respective positions.

7. The method as claimed in claim 1, wherein each system module is assigned an identifier.

8. The method as claimed in claim 7, wherein each information module is assigned to the respective system module by each assigned identifier.

9. The method as claimed in claim 8, wherein when a system module is used repeatedly, the respective information module is assigned a number of identifiers, and a different data record is created for each identifier in the information module.

10. The method as claimed in claim 9, wherein each identifier is assigned a specific information module in a memory table.

11. The method as claimed in claim 3, wherein it is determined whether the other system module has a structure, and if the other system module has a structure, which structure, with respect to the topology of additional system modules.

12. The method as claimed in claim 11, wherein the topology of the other system module is interrogated via an interface which is assigned to the respective information module.

13. The method as claimed in claim 12, wherein the topology of the first system module with respect to at least one second system module and the other system module are represented.

14. A processing system running on a processor with a memory for determining a topology of system modules, comprising:
    system modules having a defined topology with respect to other system modules the system modules selected from the group consisting of control system units and terminal components;
    information modules, each assigned to a respective system module, each information module storing connection information on the topology of the respective system module with respect to the possibilities for positioning at least one of the other system modules the information module of the respective system module automatically recognizing the existence of the at least one of the other system modules, the information module of the respective system module having no information about the topology of the at least one of the other system modules;
    an interface, assigned to each information module, via which the connection information on the topology can be transferred;
    a planning software package running on the processor by which the topology of a first system module can be retrieved via the respective interface, the planning software package producing a determined topology; and
    an output unit to produce an output representing the determined topology.

15. The processing system as claimed in claim 14, wherein the output unit graphically represents the topology determined.

16. The processing system as claimed in claim 14, wherein each of the information modules is assigned at least one data record where the information on the respective system module is stored, and where changes to the topology of the system module can be stored.

* * * * *